US006630553B2

(12) United States Patent
Gronowski

(10) Patent No.: US 6,630,553 B2
(45) Date of Patent: Oct. 7, 2003

(54) PROCESS FOR THE PREPARATION OF BUTYL RUBBER UTILIZING ALKYLALUMINUM DIHALIDES AND ALUMINOXANES

(75) Inventor: Adam Gronowski, Sarnia (CA)

(73) Assignee: Bayer Inc., Sarnia (CA)

( * ) Notice: Subject to any disclaimer, the term of this patent is extended or adjusted under 35 U.S.C. 154(b) by 0 days.

(21) Appl. No.: 10/028,608

(22) Filed: Dec. 19, 2001

(65) Prior Publication Data

US 2002/0151663 A1 Oct. 17, 2002

(30) Foreign Application Priority Data

Dec. 22, 2000 (CA) .............................................. 2329552

(51) Int. Cl.[7] .................................................. C08F 4/52
(52) U.S. Cl. ........................ 526/185; 526/226; 526/335; 526/348.2; 526/348.4; 526/348.5; 526/348.6
(58) Field of Search ........................... 526/348.6, 348.2, 526/348.5, 348.4, 335, 226, 185

(56) References Cited

U.S. PATENT DOCUMENTS

| 2,772,255 A | 11/1956 | Ernst et al. ................. 260/85.3 |
| 2,844,569 A | 7/1958 | Green et al. ............... 260/85.3 |
| 3,361,725 A | 1/1968 | Parker et al. .............. 260/85.3 |
| 3,757,000 A | 9/1973 | Scardiglia et al. ..... 260/88.2 C |
| 4,665,208 A | 5/1987 | Welborn, Jr. et al. ....... 556/179 |
| 4,874,734 A | 10/1989 | Kioka et al. ................. 502/104 |
| 4,908,463 A | 3/1990 | Bottelberghe ................ 556/179 |
| 4,924,018 A | 5/1990 | Bottelberghe ................ 556/179 |
| 4,968,827 A | 11/1990 | Davis .......................... 556/179 |
| 5,041,584 A | 8/1991 | Crapo et al. ................. 556/179 |
| 5,091,352 A | 2/1992 | Kioka et al. ................. 502/103 |
| 5,103,031 A | 4/1992 | Smith, Jr. ................... 556/179 |
| 5,157,137 A | 10/1992 | Sangokoya ................. 556/179 |
| 5,204,419 A | 4/1993 | Tsutsui et al. .............. 526/153 |
| 5,206,199 A | 4/1993 | Kioka et al. ................. 502/117 |
| 5,235,081 A | 8/1993 | Sangokoya ................. 556/179 |
| 5,248,801 A | 9/1993 | Sangokoya ................. 556/179 |
| 5,329,032 A | 7/1994 | Tran et al. ................... 556/179 |
| 5,668,232 A | 9/1997 | Langstein et al. .......... 526/189 |
| 2001/0041780 A1 * | 11/2001 | Gronowski ................. 526/226 |

FOREIGN PATENT DOCUMENTS

| CA | 2019095 | 10/1977 |
| CA | 2252295 | 4/2000 |
| CA | 2308257 | 11/2001 |
| DE | 23 28 541 | 1/1975 |
| EP | 997 481 | 5/2000 |

* cited by examiner

Primary Examiner—David W. Wu
Assistant Examiner—William Cheung
(74) Attorney, Agent, or Firm—Joseph C. Gil; Noland J. Cheung; Jennifer R. Seng

(57) ABSTRACT

A process for preparing a butyl polymer, the process comprising contacting a $C_4$ to $C_8$ monoolefin monomer with a $C_4$ to $C_{14}$ multiolefin monomer at a temperature in the range of from about −100° C. to about +50° C. in the presence of a diluent and a catalyst mixture comprising a monoalkylaluminum dihalide and an aluminoxane.

15 Claims, No Drawings

PROCESS FOR THE PREPARATION OF BUTYL RUBBER UTILIZING ALKYLALUMINUM DIHALIDES AND ALUMINOXANES

FIELD OF THE INVENTION

In one of its aspects, the present invention relates to an improved, catalytic, solution process for preparing butyl rubber polymers. More particularly, the present invention relates to a process for preparing butyl rubber polymers with improved yields (catalyst efficiencies) at polymerization temperatures of −100° C. to +50° C. in low cost, inert, hydrocarbon solvents.

BACKGROUND OF THE INVENTION

Conventional prior art processes for preparing butyl rubber polymers in solution (solution butyl processes) mainly employ aluminum trihalide catalyst systems, viz., those using aluminum trichloride, or aluminum tribromide alone (see, for example, U.S. Pat. Nos. 2,844,569 and 2,772,255). These prior art procedures are not wholly satisfactory, because they are performed at very low temperatures (e.g. −90° C. to −110° C.), leading to high refrigeration costs during polymerization. In addition, at such low temperatures polymer solutions have a very high viscosity and are difficult to handle. Further, a high viscosity of a polymer solution causes a very low rate of heat transfer, and also poor and difficult catalyst dispersion.

Aluminum trichloride has the disadvantage of having little or no solubility in many desirable hydrocarbon solvent systems, and is often introduced into the reaction feed as a solution in methyl chloride. Although aluminum tribromide is soluble in hydrocarbons, the use thereof can cause the undesirable formation of substantial amounts of very high molecular weight fractions—see U.S. Pat. No. 2,772,255 (Ernst et al.).

Alkylaluminum dihalide catalysts are generally less reactive than the aluminum halides, but offer the advantage of excellent hydrocarbon solubility. To enhance their reactivity, they are frequently used together with cocatalysts.

Canadian patent 1,019,095 [Scherbakova et al. (Scherbakova)] teaches an industrial process for manufacturing butyl rubber in solution. The catalyst system in the process comprises an alkylaluminum halide (e.g. ethylaluminum sesquichloride (($C_2H_5$)$_2$AlCl.Cl$_2$AlC$_2$H$_5$)), with water or hydrogen sulfide as a co-catalyst, and isopentane as a solvent. Not many details are known about the process, which most probably takes place at −85° C. to −80° C., with a content of solids in solution at about 10 weight percent.

Parker, et al. (U.S. Pat. No. 3,361,725) teaches that mixtures of dialkylaluminum halides (e.g., dialkylaluminum monochlorides) and monoalkylaluminum dihalides (e.g., monoalkylaluminum dichlorides), in which the latter component is present in small amounts, are effective solution butyl rubber catalysts, operate at far more economical (higher) temperatures and form excellent high molecular weight rubbers than then conventional methods. Usually, the rubber polymerizations using the above catalyst mixtures are conducted at temperatures ranging from about −87° C. to −57° C., and preferably at temperatures of −79° C. to −68° C., with excellent results being achieved with temperatures at or near −73° C. at approximately atmospheric pressure.

In the Parker, et al. process, the polymers are soluble in the unreacted monomers, so that relatively minor amounts of diluent can be used. Reasonably small quantities of diluent can be employed—e.g., from 0 to 50 vol. percent diluent based on total volume of monomer and saturated catalyst solvent. Usually, however, the concentration of diluent during polymerization ranges from 0 to 20 vol. percent. Preferably, the $C_5$ to $C_6$ normal paraffins are used—e.g., n-pentane and n-hexane.

The Parker, et al. catalyst mixture contains from about 2 to about 10 mole percent of the monoalkylaluminum dihalide and from about 90 to 98 mole percent of the dialkylaluminum monohalide. According to Parker, et al., this is the preferred way to achieve the most advantageous combination of ease of polymerization coupled with catalyst efficiency and good temperature control over the polymerization reaction. This latter characteristic is a significant advantage of the method. On the other hand, the reaction times require from about 50 to 100 minutes within the preferred temperature range.

In a previous invention [Canadian Patent Application 2,252,295 (Gronowski)], Bayer improved the Parker, et al. process by the direct addition of minute amounts of water or aluminoxane to the catalyst solution. The use of this improved catalytic system resulted in higher reaction rates and the formation of a rubber having a higher molecular weight than that formed using the Parker, et al. catalyst. This made it possible to carry out polymerizations at even more economical (i.e. higher) temperatures than with the method taught by Parker, et al., with the resulting rubber still displaying desirable properties. In addition, good temperature control was maintained during polymerizations, while the isoprene content of the rubber was higher than that of control reactions using the conventional Parker, et al. catalyst.

Dialkylaluminum halides alone do not catalyze butyl rubber polymerization. Monoalkylalumium dihalides can initiate the polymerizations on their own, but, as mentioned before, to enhance their reactivity they are frequently used together with cocatalysts. To date, such cocatalysts have been organometallic halides or halogen-containing organic compounds of one sort or another.

It would be useful to have a method for the manufacture of butyl rubber having better yields (catalyst efficiencies) than those attainable to date using an alkylaluminum dihalide and which does not have a negative impact on the molecular weight of the resulting polymer.

SUMMARY OF THE INVENTION

It has been determined that alkylaluminum dihalides can be activated by the direct addition of a small amount of aluminoxane, and that an efficient catalyst system based on a mixture of these two compounds can be used for the manufacture of butyl rubber.

It is an object of the present invention to provide a novel method for the manufacture of butyl rubber using a catalyst system based on alkylaluminum dihalides activated by a direct addition of a small amount of aluminoxane.

Accordingly, the present invention provides a process for preparing a butyl polymer with improved catalyst efficiencies based on alkylaluminum dihalide as a catalyst, the process comprising contacting a $C_4$ to $C_8$ monoolefin monomer with a $C_4$ to $C_{14}$ multiolefin monomer at a temperature in the range of from about −100° C. to about +50° C. in the presence of a diluent and a catalyst mixture comprising a monoalkylaluminum dihalide and an aluminoxane.

DETAILED DESCRIPTION OF THE INVENTION

As mentioned above, the present process relates to the preparation of butyl rubber polymers. The term "butyl rubber", as used throughout this specification, is intended to denote polymers prepared by reacting a major portion, e.g., from about 70 to 99.5 parts by weight, usually 85 to 99.5 parts by weight of an isomonoolefin such as isobutylene, with a minor portion, e.g., from about 30 to 0.5 parts by weight, usually 15 to 0.5 parts by weight, of a multiolefin, e.g., a conjugated diolefin such as isoprene or butadiene, for each 100 weight parts of these monomers reacted. The isoolefin is, in general, a $C_4$ to $C_8$ compound, e.g., isobutylene, 2-methyl-1-butene, 3-methyl-1-butene, 2-methyl-2-butene, and 4-methyl-1-pentene.

Those of skill in the art will recognize that it is possible to include an optional third monomer to produce a butyl terpolymer. For example, it is possible to include a styrenic monomer, preferably in an amount up to about 15 weight percent of the monomer mixture. The preferred styrenic monomer may be selected from the group consisting of p-methylstyrene, styrene, α-methylstyrene, p-chlorostyrene, p-methoxy-styrene, indene (and derivatives thereof) and mixtures thereof. The most preferred styrene monomer is selected from the group consisting of styrene, p-methylstyrene and mixtures thereof. Other suitable copolymerizable termonomers will be apparent to those of skill in the art.

The present process is conducted in a diluent. While the diluent may be conventional within the art (e.g., methyl chloride), it is preferred to utilize an aliphatic hydrocarbon diluent. Suitable aliphatic hydrocarbon diluents which can be used in accordance with the present process include, but are not limited to, $C_4$ to $C_8$ saturated aliphatic and alicyclic hydrocarbons such as pentane, hexane, heptane, isooctane, methylcyclohexane, cyclohexane, etc. Preferably, the $C_5$ to $C_6$ normal paraffins are used, e.g., n-pentane and n-hexane. The same saturated hydrocarbons serve as a "solvent" for the catalyst mixture.

The catalyst mixture used in the present process comprises a monoalkylaluminum dihalide activated by the direct addition of a small amount of aluminoxane. Such a catalyst system is a homogenous mixture.

The monoalkylaluminum dihalides employed in accordance with the present process may be selected from the $C_1$ to $C_8$ monoalkylaluminum dihalides, and are, preferably, $C_1$ to $C_4$ monoalkylaluminum dihalides. Suitable exemplary preferred $C_1$ to $C_4$ monoalkylaluminum dihalides which can be employed in accordance with the present process include, but are not limited to, methylaluminum dichloride, ethylaluminum dichloride, propylaluminum dichlorides, butylaluminum dichloride, isobutylaluminum dichloride, etc.

The amount of monoalkylaluminum dihalide used in the practice of the present invention is in the range of from about 0.002 to about 1.0 weight percent, based upon the total amount of monomer present. More preferably, the amount is in the range of from about 0.001 to about 0.2 weight percent and, most preferably, in the range of from about 0.01 to 0.05 weight percent.

As stated hereinabove, the present process is conducted in the presence of an aluminoxane. The aluminoxane component useful as a cocatalyst typically is an oligomeric aluminum compound represented by the general formula $(R^2-Al-O)_n$, which is a cyclic compound, or $R^2(R^2-Al-O)_nAlR^2_2$, which is a linear compound. In the general aluminoxane formula, $R^2$ are independently selected $C_1$ to $C_{10}$ hydrocarbyl radicals (for example, methyl, ethyl, propyl, butyl or pentyl) and n is an integer of from 1 to about 100. $R^2$ may also be, independently, halogen, including fluorine, chlorine and iodine, and other non-hydrocarbyl monovalent ligands such as amide, alkoxide and the like, provided that not more than 25 mole percent of $R^2$ are non-hydrocarbyl as described here. Most preferably, $R^2$ is methyl and n is at least 4.

Aluminoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an aluminoxane. Generally, however prepared, the reaction of an aluminum alkyl with a limited amount of water yields a mixture of the linear and cyclic species, and also there is a possibility of interchain complexation (crosslinking). The catalytic efficiency of aluminoxanes is dependent not only on a given preparative procedure but also on a deterioration in the catalytic activity ("aging") upon storage, unless appropriately stabilized. Methylaluminoxane and modified methylaluminoxanes are preferred. For further descriptions, see, for example, one or more of the following United States patents:

| | | |
|---|---|---|
| 4,665,208 | 4,952,540 | 5,041,584 |
| 5,091,352 | 5,206,199 | 5,204,419 |
| 4,874,734 | 4,924,018 | 4,908,463 |
| 4,968,827 | 5,329,032 | 5,248,801 |
| 5,235,081 | 5,157,137 | 5,103,031 |

In the present invention, it is preferred that aluminoxane is added to the catalyst solution in such an amount that the weight ratio of alkylaluminum dihalide to aluminoxane is in the range of from about 50:1 to about 1:50, preferably from about 10:1 to about 1:10 and, most preferably, in the ratio of from about 1:1 to about 1:5.

The application of the present invention results in the production of butyl rubber with improved yields, i.e., with higher catalyst efficiencies. In addition, the rubber displays comparable or higher molecular weights than those obtained using conventional means. This aspect is also seen from comparing the Example 1 with Examples 5 & 6, wherein the thermal effects are similar. Further, this rubber has a narrow polydispersity index ($M_w/M_n$). This is surprising, as the use of a catalyst system comprising a dialkyl aluminum halide, an alkylaluminum dihalide and an aluminoxane (i.e. the catalyst system disclosed in co-pending Canadian Patent Application 2,308,257; filed May $5^{th}$ 2000) yields a rubber with a broader polydispersity index than that of a control reaction in the absence of aluminoxane. That is, the catalyst system of the co-pending application yields a product having broader molecular weight distribution than that of a control.

Embodiments of the present invention will be illustrated with reference to the following Examples, which should not be use to construe or limit the scope of the present invention.

EXAMPLES

Example 1

To a 50 mL Erlenmeyer flask, 9.50 mL of distilled hexane and 0.50 mL $EtAlCl_2$ (1.0 M solution in hexanes) were added at room temperature forming a catalyst solution.

To a 250 mL 3-neck reaction flask equipped with an overhead stirrer, 20.0 mL of isobutylene at −80° C. were added, followed by 40.0 mL hexane at room temperature and 0.45 mL isoprene at room temperature. The reaction mixture was cooled down to −80° C. and 0.400 mL of the catalyst solution was added to start the reaction.

The reaction was carried out in an MBRAUN™ dry box under the atmosphere of dry nitrogen. The temperature changes during the reaction were followed by a thermocouple. After 10 minutes, the reaction was terminated by adding 5 mL of ethanol into the reaction mixture.

The polymer solution was poured on an aluminum tare lined with Teflon and the solvent and unreacted monomers were allowed to evaporate in a vacuum oven at 70° C.

The gravimetrically determined yield was 26.9 weight percent, $M_n$=118 800, $M_w$=290 900, and isoprene content was 1.8 mole percent.

This example represents the conventional method and is provided for comparative purposes only.

Example 2

The methodology of Example 1 was repeated except that 25 µl of methylaluminoxane (MAO, 10 weight percent solution in toluene) was added directly to the catalyst solution prepared in Example 1, above. After stirring, 0.400 mL of this solution was immediately used to start the reaction. The reaction time was 5 min.

The polymer yield was 40.4 weight percent, $M_n$=150 500, $M_w$=297 100 and isoprene content in the rubber was 1.7 mole percent.

in toluene) was added directly to the catalyst solution prepared in Example 1, above. After stirring, 0.400 mL of this solution was immediately used to start the reaction. The reaction time was 5 min.

The polymer yield was 25.7 weight percent, $M_n$=165 100, $M_w$=321,000 and isoprene content in the rubber was 1.7 mole percent.

Example 6

The methodology of Example 1 was repeated except 150 µl of methylaluminoxane (MAO, 10 weight percent solution in toluene) was added directly to the catalyst solution prepared in Example 1, above. After stirring, 0.400 mL of this solution was immediately used to start the reaction. The reaction time was 5 min.

The polymer yield was 17.4 weight percent, $M_n$=193 700, $M_w$=339,500 and isoprene content in the rubber was 1.4 mole percent.

The results from Examples 1–6 are presented in Table 1. These results illustrate the advantageous effect of using the novel catalyst system on polymer yields (catalyst efficiencies), as well as on molecular weights. Surprisingly, adding MAO to activate alkylaluminum dihalide does not result in broader molecular weight distribution.

TABLE 1

| Example | Amount of MAO added (µl) | Time (min) | Yield (wt. %) | Catalyst efficiency (g rubber/ $g_{EADC}$ · min) | $M_w$ | $M_w/M_n$ | Isoprene content of rubber (mole %) | Δ (° C.) |
|---|---|---|---|---|---|---|---|---|
| 1 | 0 (control) | 10 | 26.9 | 152 | 290 900 | 2.4 | 1.8 | 4 |
| 2 | 25 | 5 | 40.4 | 458 | 297 100 | 2.0 | 1.7 | 11.5 |
| 3 | 50 | 5 | 52.0 | 590 | 293 400 | 2.1 | 1.6 | 15 |
| 4 | 75 | 5 | 40.0 | 455 | 303 200 | 2.0 | 1.7 | 13.5 |
| 5 | 100 | 5 | 25.7 | 291 | 321 000 | 1.9 | 1.7 | 8 |
| 6 | 150 | 5 | 17.4 | 198 | 339 500 | 1.8 | 1.4 | 5 |

Example 3

The methodology of Example 1 was repeated except 50 µl of methylaluminoxane (MAO, 10 weight percent solution in toluene) was added directly to the catalyst solution prepared in Example 1, above. After stirring, 0.400 mL of this solution was immediately used to start the reaction. The reaction time was 5 min.

The polymer yield was 52.0 weight percent, $M_n$=142 900, $M_w$=293 400 and isoprene content in the rubber was 1.6 mole percent.

Example 4

The methodology of Example 1 was repeated except 75 µl of methylaluminoxane (MAO, 10 weight percent solution in toluene) was added directly to the catalyst solution prepared in Example 1, above. After stirring, 0.400 mL of this solution was immediately used to start the reaction. The reaction time was 5 min.

The polymer yield was 40.0 weight percent, $M_n$=155,000, $M_w$=303,200 and isoprene content in the rubber was 1.7 mole percent.

Example 5

The methodology of Example 1 was repeated except 100 µl of methylaluminoxane (MAO, 10 weight percent solution While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A process for preparing a butyl polymer, the process comprising the step of contacting a $C_4$ to $C_8$ monoolefin monomer with a $C_4$ to $C_{14}$ multiolefin monomer at a temperature in the range of from about −100° C. to about +50° C. in the presence of a diluent and a catalyst mixture comprising a monoalkylaluminum dihalide and an aluminoxane, with the proviso that the catalyst mixture does not contain a dialkylaluminum monohalide.

2. A process according to claim 1, wherein the amount of monoalkylaluminum dihalide is in the range of from about 0.0001 to about 1.0 weight percent, based upon the total amount of monomer present.

3. A process according to claim 2, wherein the amount of monoalkylaluminum dihalide is in the range of from about 0.001 to about 0.2 weight percent, based upon the total amount of monomer present.

4. A process according to claim 3, wherein the amount of monoalkylaluminum dihalide is in the range of from about 0.01 to about 0.05 weight percent, based upon the total amount of monomer present.

5. A process according to claim 1, wherein the monoalkylaluminum dihalide is selected from the group consisting of methylaluminum dichloride, ethylaluminum dichloride, propylaluminum dichlorides and butylaluminum dichlorides.

6. A process according to claim 1, wherein the aluminoxane is methylaluminoxane.

7. A process according to claim 1, wherein the weight ratio of monoalkylaluminum dihalide to aluminoxane is from about 50:1 to about 1:50.

8. A process according to claim 7, wherein the weight ratio of monoalkylaluminum dihalide to aluminoxane is from about 10:1 to about 1:10.

9. A process according to claim 8, wherein the weight ratio of monoalkylaluminum dihalide to aluminoxane is from about 1:1 to about 1:5.

10. A process according to claim 1, wherein the aluminoxane is added to a solution of the monoalkylaluminum dihalide in the diluent, the resulting homogeneous solution being used to initiate polymerization reactions.

11. A process according to claim 1, wherein the diluent is a $C_4$ to $C_8$ aliphatic hydrocarbon.

12. A process according to claim 1, wherein the $C_4$ to $C_8$ monoolefin monomer is an isomonoolefin.

13. A process according to claim 1, wherein the $C_4$ to $C_{14}$ multiolefin monomer is a $C_4$ to $C_{10}$ conjugated diolefin.

14. A process according to claim 1, wherein the temperature is in the range of from about −80° C. to about +20° C.

15. A process for preparing a butyl polymer comprising the step of contacting a $C_4$ to $C_8$ isomonoolefin monomer with a $C_4$ to $C_{14}$ conjugated diolefin monomer at a temperature in the range of from about −80° C. to about +20° C. in the presence of a $C_4$ to $C_8$ aliphatic hydrocarbon diluent and a catalyst mixture comprising from about 0.1 to about 0.6 weight percent of a monoalkylaluminum dihalide, based upon the total amount of monomer present, and an aluminoxane, wherein the weight ratio of monoalkylaluminum dihalide to aluminoxane is in the range of from about 30:1 to about 10:1.

* * * * *